Patented Sept. 20, 1932

1,877,972

UNITED STATES PATENT OFFICE

HEINRICH RITTER, OF FRANKFORT-ON-THE-MAIN-FECHENHEIM, GERMANY, ASSIGNOR TO GENERAL ANILINE WORKS, INC., OF NEW YORK, N. Y., A CORPORATION OF DELAWARE

NEW CONDENSATION PRODUCT OF THE ANTHRAQUINONE SERIES AND A PROCESS OF MAKING SAME

No Drawing. Application filed July 7, 1931, Serial No. 549,321, and in Germany July 25, 1930.

My present invention relates to a new condensation product of the anthraquinone series and a process of making same.

According to U. S. Patent No. 856,811 by heating 2.2'-dimethyl-1.1'-dianthraquinonyl, particularly with addition of a condensing agent such as alcoholic potash, a vat dyestuff is obtained to which, according to Scholl's publication in Berichte der Deutschen chem. Gessellschaft, vol. 43, page 346, the following formula is assigned:

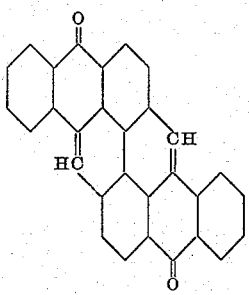

and which Scholl has named "pyranthrone."

In accordance with the present invention, in a surprising manner another new yellow dyestuff is obtained by acting on 2.2'-dimethyl-1.1'-dianthraquinonyl with an alkaline condensing agent under moderate conditions, i. e. advantageously in the presence of a suitable diluent such as ethyl alcohol, cyclohexanol or methylcyclohexanol at temperatures below 100° C.

In view of its properties, the new condensation product probably corresponds to the following formula:

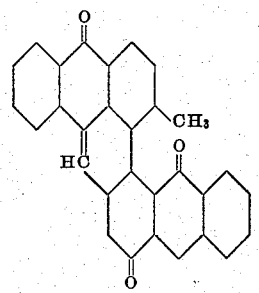

Apparently under the reaction conditions applied only the one methyl group enters into the condensation. The constitution of the new product is supported by the fact that it can be converted into pyranthrone by further treatment with an alkaline condensing agent under more energetic conditions.

It is a very surprising observation that the new intermediate product is easily vattable and can be fixed on the vegetable fibre in fast shades. It may be also used as intermediate for the production of further condensation products.

It can be easily separated from pyranthrone, which may be simultaneously formed in some quantities, since the new product is essentially more soluble in the vat and also in organic solvents than pyranthrone.

Example 100 parts of 2.2'-dimenthyl-1.1'-dianthraquinonyl are heated with 150 parts of caustic potash in about 750 parts of methylcyclohexanol for about 4 hours while stirring at 75–80° C. Then the brownish reaction mass is diluted with much water and the methylcyclohexanol is expelled with steam. Some quanities of pyranthrone formed as by-products are removed by filtration and the dark orangebrown filtrate containing the new product in form of its leucocompound is treated with an oxidizing agent such as hydrogen-peroxide, chloride of lime, etc. or air is blown in. The new product separated thereby as a yellow precipitate is filtered off washed out and dried. It represents a yellow powder, which is substantially more soluble in the usual organic solvents than pyranthrone. When recrystallized from, for instance glacial acetic acid or mono- or trichlorobenzene it forms yellow crystals soluble in concentrated sulfuric acid with an intense reddish brown color, in fuming sulfuric acid of about 60% $SO_3$ content with an intense green color, whereas pyranthrone dissolves both in concentrated and fuming sulfuric acid with a dark blue color. The new product dyes cotton from an orange vat fast yellow shades.

I claim:

1. As a new compound the condensation product of the anthraquinone series corresponding probably to the formula:

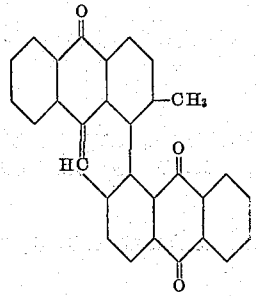

which forms when recrystallized from the usual organic solvents yellow crystals soluble in concentrated sulfuric acid with an intense reddish brown color, in fuming sulfuric acid of 60% $SO_3$ content with an intense green color, which product dyes cotton from an orange vat fast yellow shades.

2. A process for producing a new condensation product of the anthraquinone series which process comprises acting on 2.2'-dimethyl-1.1'-dianthraquinonyl with an alkaline condensing agent in the presence of an organic diluent at temperatures below 100° C.

In testimony whereof, I affix my signature.

HEINRICH RITTER.